US010065057B1

(12) United States Patent
Hung (10) Patent No.: US 10,065,057 B1
(45) Date of Patent: Sep. 4, 2018

(54) SAFETY CATCH CONNECTOR (71) Applicant: YOKE INDUSTRIAL CORP., Taichung (TW)

(72) Inventor: Wei-Chieh Hung, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 15/672,441

(22) Filed: Aug. 9, 2017

(30) Foreign Application Priority Data

Jun. 16, 2017 (TW) .............................. 106120257 A (51) Int. Cl.
*A62B 35/00* (2006.01)

(52) U.S. Cl.
CPC ..... *A62B 35/0037* (2013.01); *Y10T 24/45372* (2015.01)

(58) Field of Classification Search
CPC ............. A62B 35/0037; Y10T 24/4019; Y10T 24/4016; Y10T 24/4005; Y10T 24/45361; Y10T 24/45366; Y10T 24/45372; Y10T 24/45403
See application file for complete search history.

(56) References Cited

U.S. PATENT DOCUMENTS

| 8,938,864 | B2 * | 1/2015 | Casebolt | ............ | A62B 35/0037 |
| | | | | | 24/573.11 |
| 9,435,484 | B1 | 9/2016 | Yang | | |
| 2009/0196683 | A1 * | 8/2009 | Lunn | ....................... | F16G 15/06 |
| | | | | | 403/154 |
| 2012/0297590 | A1 * | 11/2012 | Spataro | ................... | F16B 45/02 |
| | | | | | 24/599.9 |
| 2013/0104351 | A1 * | 5/2013 | Casebolt | ............ | A62B 35/0037 |
| | | | | | 24/522 |

FOREIGN PATENT DOCUMENTS

TW         M474533 U        3/2014

OTHER PUBLICATIONS

Search report for TW106120257, dated Dec. 18, 2017, Total of 1 page.
English Abstract for TWM474533 (U), Total of 1 page.

* cited by examiner

*Primary Examiner* — Robert Sandy
*Assistant Examiner* — Michael S Lee
(74) *Attorney, Agent, or Firm* — Lynette Wylie; Apex Juris, pllc.

(57) ABSTRACT

A safety catch connector, which is adapted to be connected to a sling and a harness, including a body, a catch member, a first locking member and a second locking member. The body is adapted to be connected to the harness. The catch member is pivotally connected to the body for pivoting relative to the body between an unlocked position and a locked position. The first locking member and the second locking member are disposed on the body. The first locking member is operable to move between a first position and a second position on the body. The second locking member is operable to move between a third position and a fourth position on the body. When the first locking member is at the first position and the second locking member is at the third position, the catch member is locked at the locked position.

11 Claims, 13 Drawing Sheets

SAFETY CATCH CONNECTOR

BACKGROUND OF THE INVENTION

1. Technical Field

The present invention relates generally to a safety equipment at height, and more particularly to a safety catch connector.

2. Description of Related Art

Based on work safety requirements, an operator working at height has to do accident prevention, such as wearing a harness which is connected to a sling fixed on a support via a lifting lug. Once the operator accidentally falls, the sling and the hardness worn on the operator could lift the operator, preventing the operator from falling from height.

Figure 1:
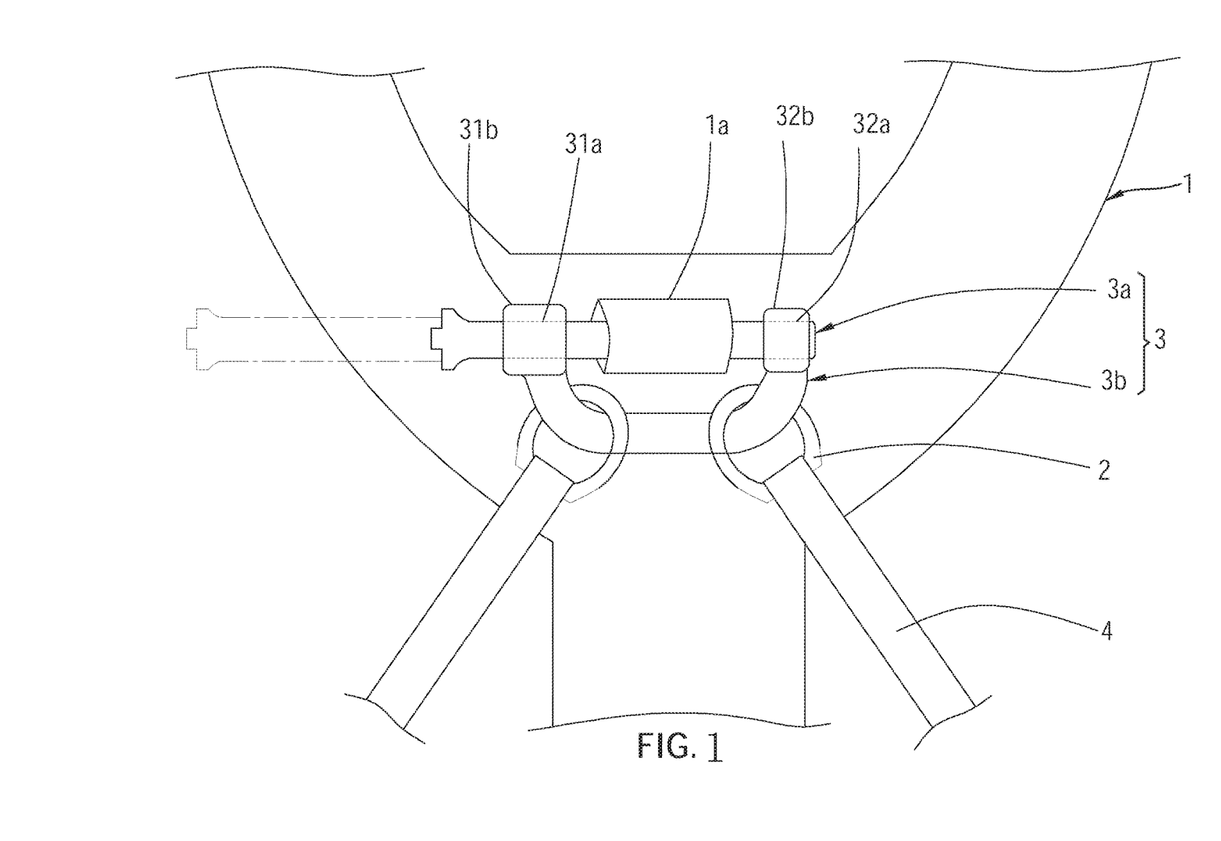
FIG. 1 is a schematic diagram of a conventional safety catch connector.

U.S. Pat. No. 9,435,484B1, titled "Safety catch connector", discloses a safety catch connector 3 which is adapted to connect a harness 1 and a lifting lug 2. As shown in FIG. 1, the safety catch connector 3 includes a U-shaped member 3b, a shaft 3a penetrating a positioning portion 1a of the harness 1, and two locking members (not shown) adapted to fix the shaft 3a in the U-shaped member 3b. The U-shaped member 3b is adapted to be caught by the lifting lug 2 which is connected to a sling 4. Two ends of the U-shaped member 3b respectively has a first sleeve 31b and a second sleeve 32b, and the shaft 3a can penetrate the first sleeve 31b and the second sleeve 32b.

When the shaft 3a passes through the first sleeve 31b and the second sleeve 32b, a first section 31a of the shaft 3a is located in the first sleeve 31b, and a second section 32a of the shaft 3a is located in the second sleeve 32b. The first section 31a of the shaft 3a could be fixed in the first sleeve 31b by the locking members, wherein the locking members are perpendicular to each other, so that the shaft 3a is restricted to move relative to the U-shaped member 3b.

For operating the safety catch connector 3, a user has to unlock the locking members first so as to move the second section 32a of the shaft 3a away from the second sleeve 32b. Then, the lifting lug 2 can be put around the U-shaped member 3b through one end of the second section 32a of the shaft 3a. After that, the second section 32a of the shaft 3a can penetrate the second sleeve 32b, and then the shaft 3a can be fixed by the locking members.

However, the user is liable to inadvertently disengage the shaft 3a from the positioning portion 1a while using the safety catch connector 3, as illustrated in FIG. 1. Accordingly, a user has to make the shaft 3a penetrate the harness 1 and the second sleeve 32b after the lifting lug 2 is caught on the U-shaped member 3b, so as to engage the harness 1 and the lifting lug 2. As a result, the steps of using the safety catch connector 3 is complicated. In addition, an operator working at height usually wears gloves such that the difficulty and inconvenience of using the safety catch connector 3 are increased.

BRIEF SUMMARY OF THE INVENTION

In view of the above, the primary objective of the present invention is to provide a safety catch connector, which could be easily locked and unlocked.

The present invention provides a safety catch connector, which is adapted to be connected to at least one sling including a lifting lug, and a harness worn by a person. The safety catch connector includes a body, a catch member, a first locking member, and a second locking member. The body is adapted to be connected to the harness. The catch member is adapted to be caught by the lifting lug, and includes a first section and a second section. The first section of the catch member is pivotally connected to the body, and the catch member is pivotable between an unlocked position and a locked position relative to the body. When the catch member is at the locked position, the second section of the catch member abuts against the body. The first locking member is disposed on the body and is operable to move between a first position and a second position on the body. When the first locking member is at the first position, the catch member is locked at the locked position. The second locking member is disposed on the body and is operable to move between a third position and a fourth position on the body. When the second locking member is at the third position, the catch member is locked at the locked position.

By pivoting the catch member on the body, the catch member could not easily be disengaged with the body, and the safety catch connector could be easily locked and unlocked.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 4b is a sectional view along the 4b-4b line in FIG. 4a;

FIG. 4c is a sectional view along the 4c-4c line in FIG. 4a;

FIG. 7b is similar to FIG. 7a;

DETAILED DESCRIPTION OF THE INVENTION

Figure 2:
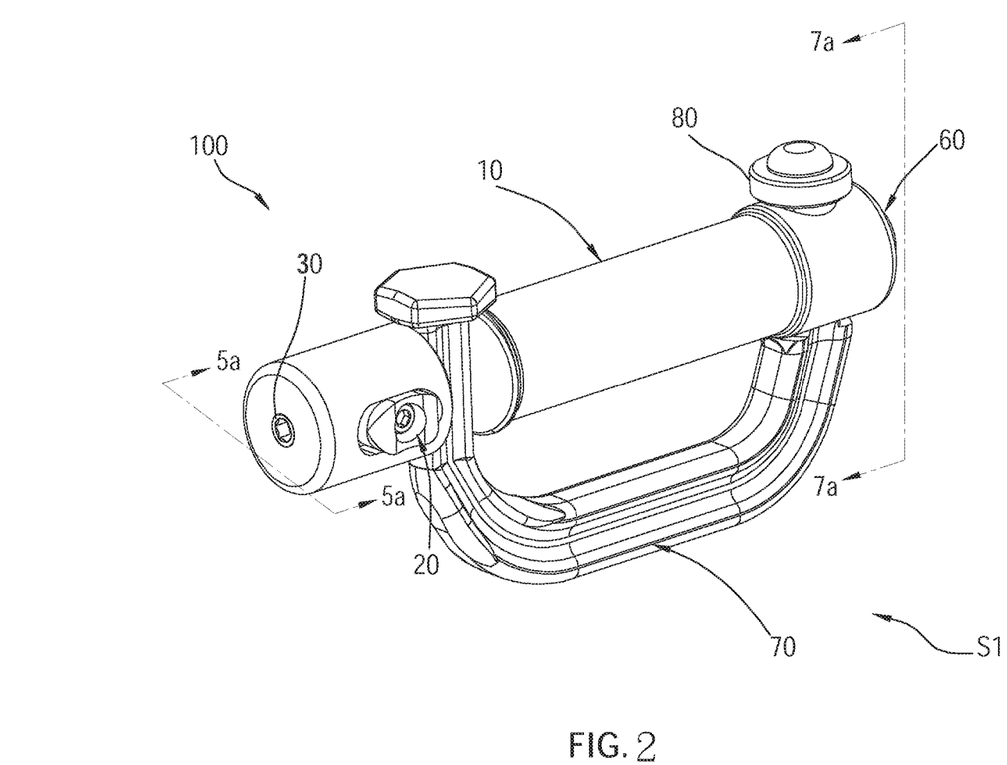
FIG. 2 is a perspective view of the safety catch connector of an embodiment of the present invention.
Figure 3:
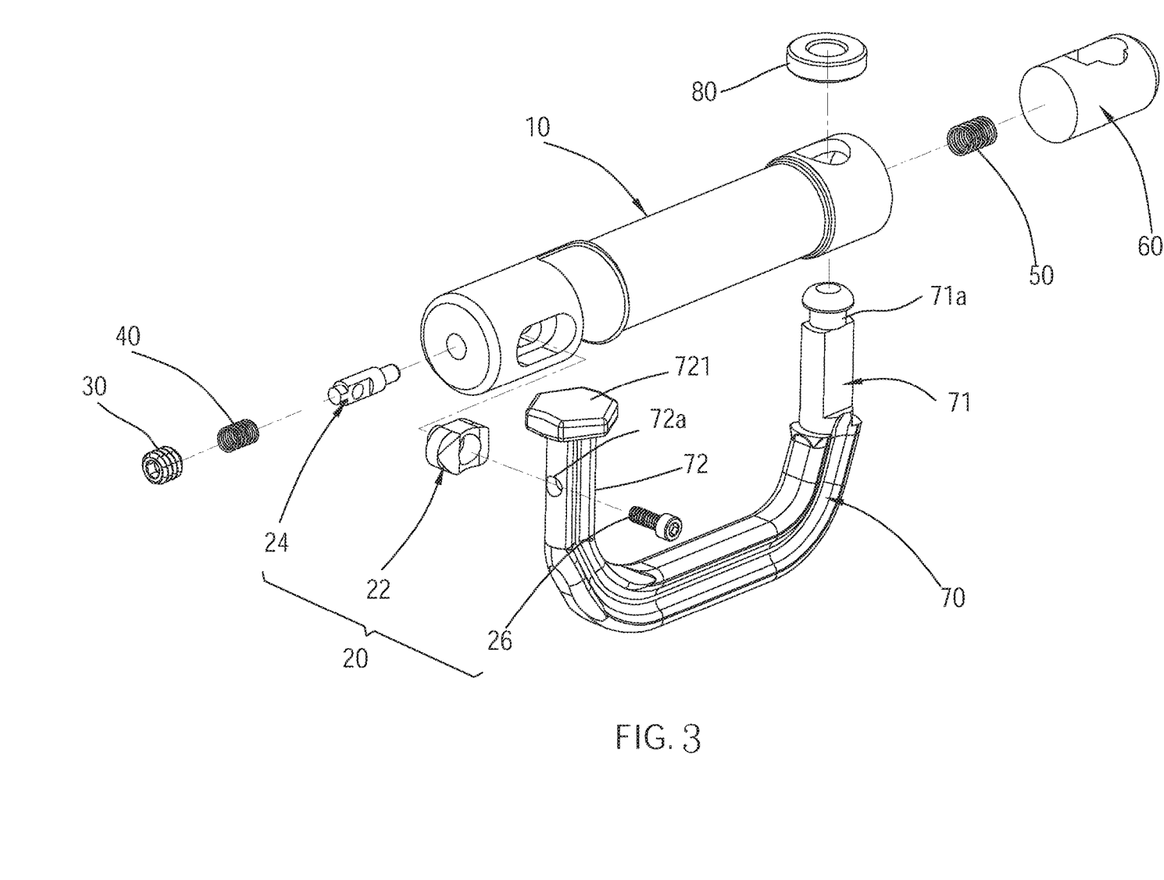
FIG. 3 is an exploded view of the safety catch connector of the embodiment.

As illustrated in FIG. 2 and FIG. 3, a safety catch connector 100 of an embodiment of the present invention is adapted to be connected to a sling and a harness, wherein the harness is adapted to be worn by a person, such as an operator. The sling includes a lifting lug adapted to be connected to the safety catch connector 100, wherein the sling is fixed on a support. In this way, when the operator accidentally falls, the harness and the sling could lift the operator, preventing the operator from falling from height.

The safety catch connector 100 includes a body 10, a catch member 70, a first elastic member 40, a second elastic member 50, a first locking member 20, a second locking member 60, a blocking member 30, and a blocking ring 80.

Figure 4A:
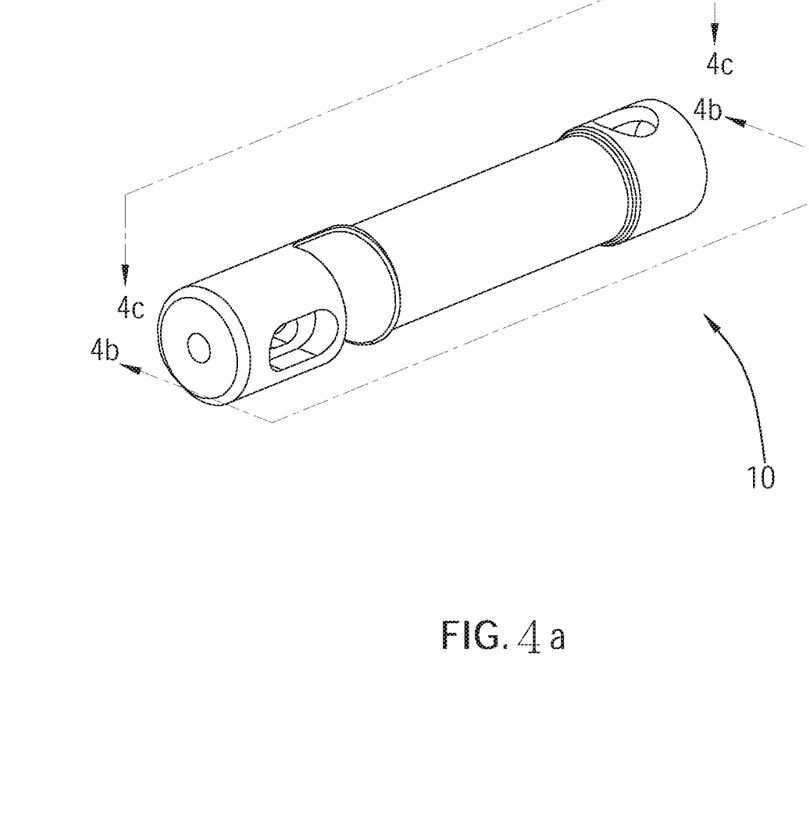
FIG. 4a is a perspective view, showing a part of the components of the safety catch connector of the embodiment.
Figure 4B:
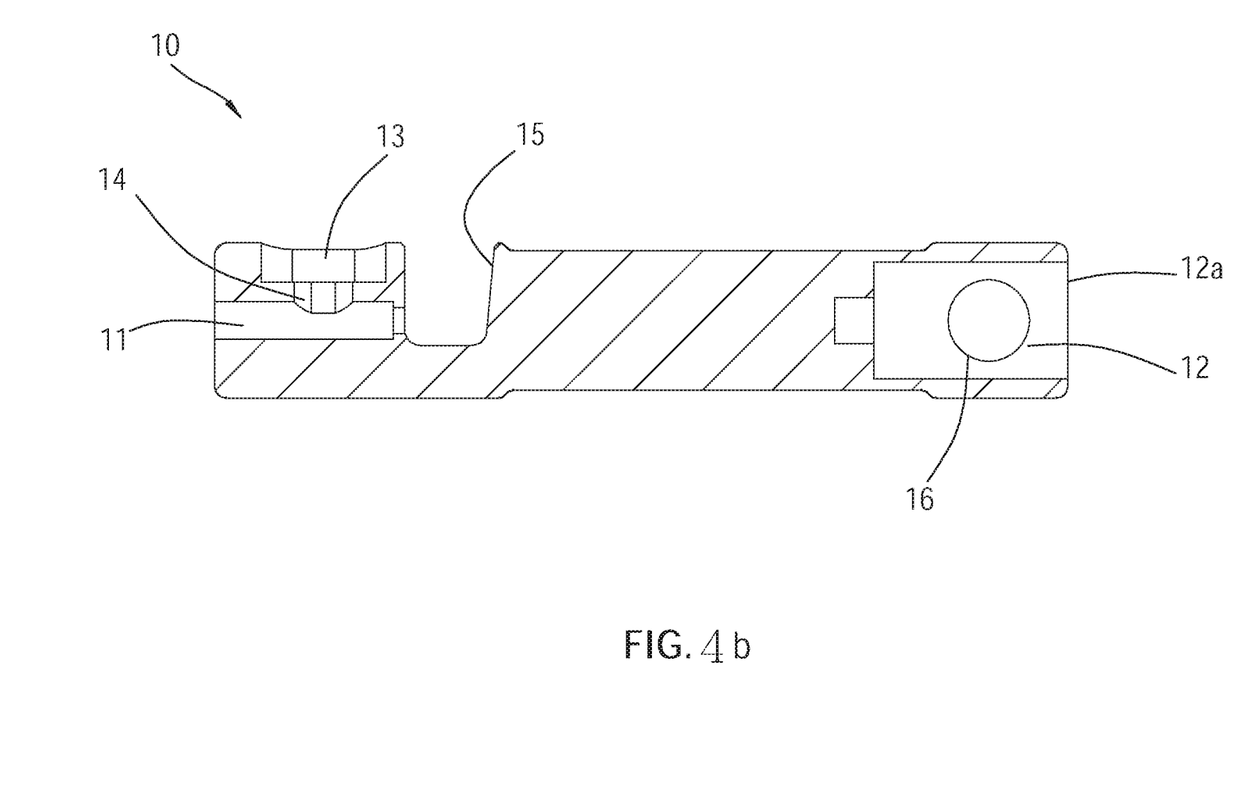
Figure 4C:
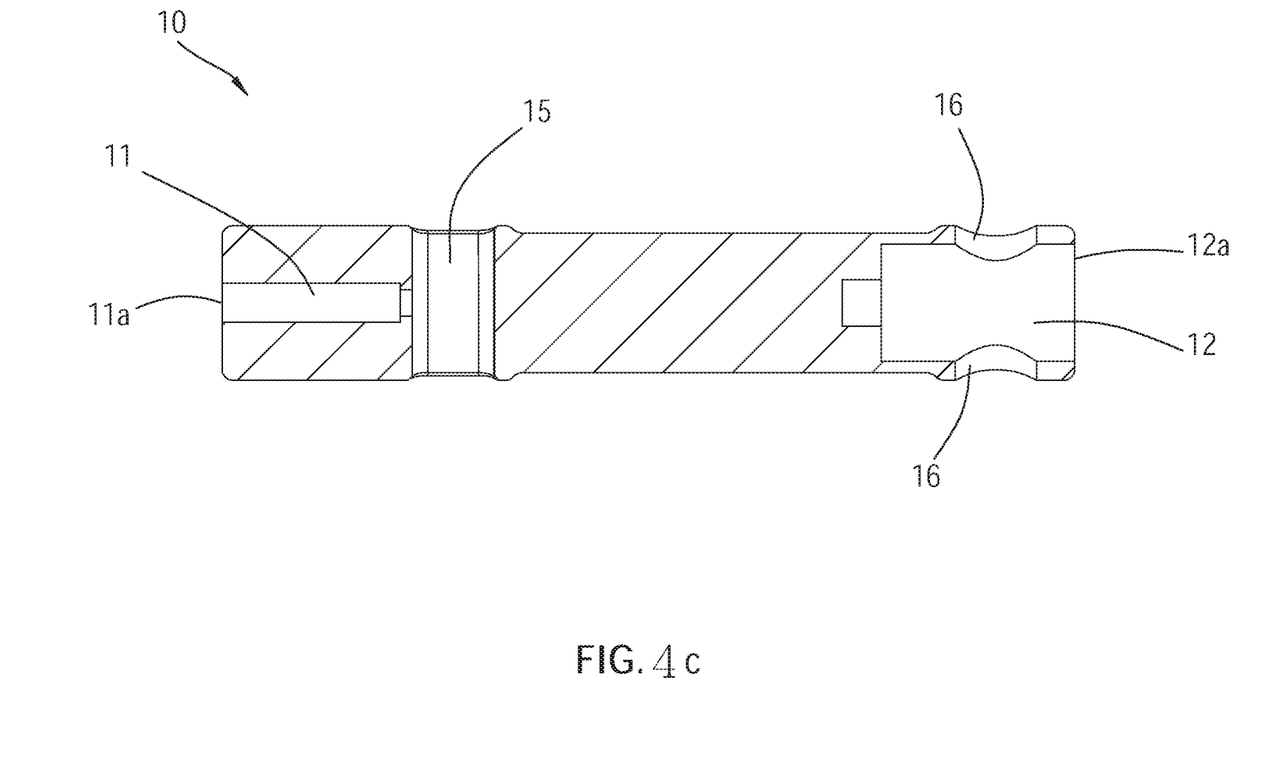

The body 10 is adapted to be connected to the harness, as shown in FIG. 4a to FIG. 4c, and includes a first containing bore 11 disposed in an axial direction thereof, a second containing bore 12 disposed in the axial direction thereof, and a groove 13. The first containing bore 11 and the second containing bore 12 are respectively disposed at two ends of the body 10, wherein the first containing bore 11 includes a first opening 11a located on one of the ends of the body 10, and the first opening 11a communicates with the outside of the body. The second containing bore 12 includes a second opening 12a located on another end of the body 10, wherein the second opening 12a communicates with the outside of the body. The body 10 includes a passage 14, a recess 15, and two through holes 16, wherein all of the passage 14, the recess 15, and the two through holes 16 are disposed in a radial direction of the body. Two ends of the passage 14 respectively communicate with the groove 13 and the first containing bore 11, and the recess 15 communicates with the first containing bore 11. The through holes 16 are disposed coaxially, and the second containing bore 12 communicates with the outside of the body 10 via each of the through holes 16.

Figure 5A:
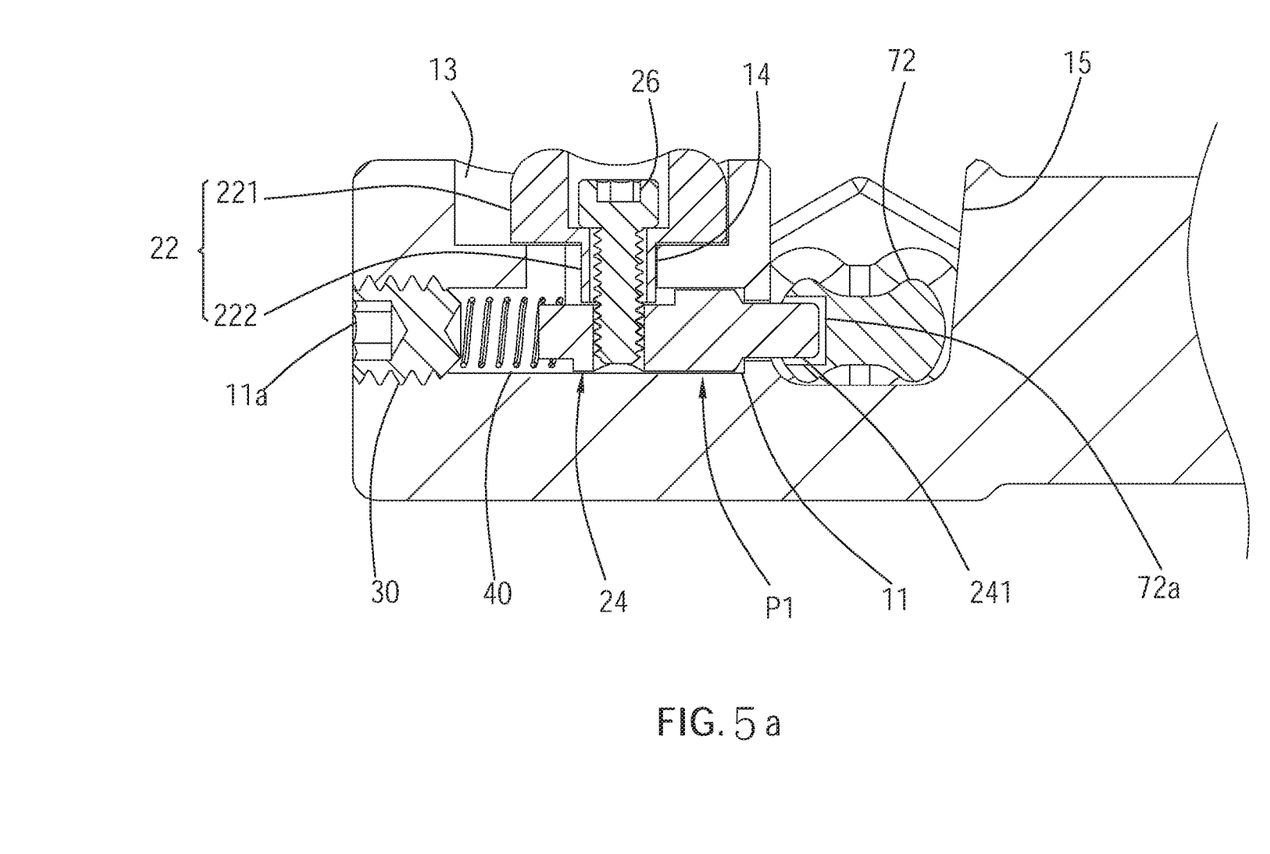
FIG. 5a is a sectional view along the 5a-5a line in FIG. 2.
Figure 5B:
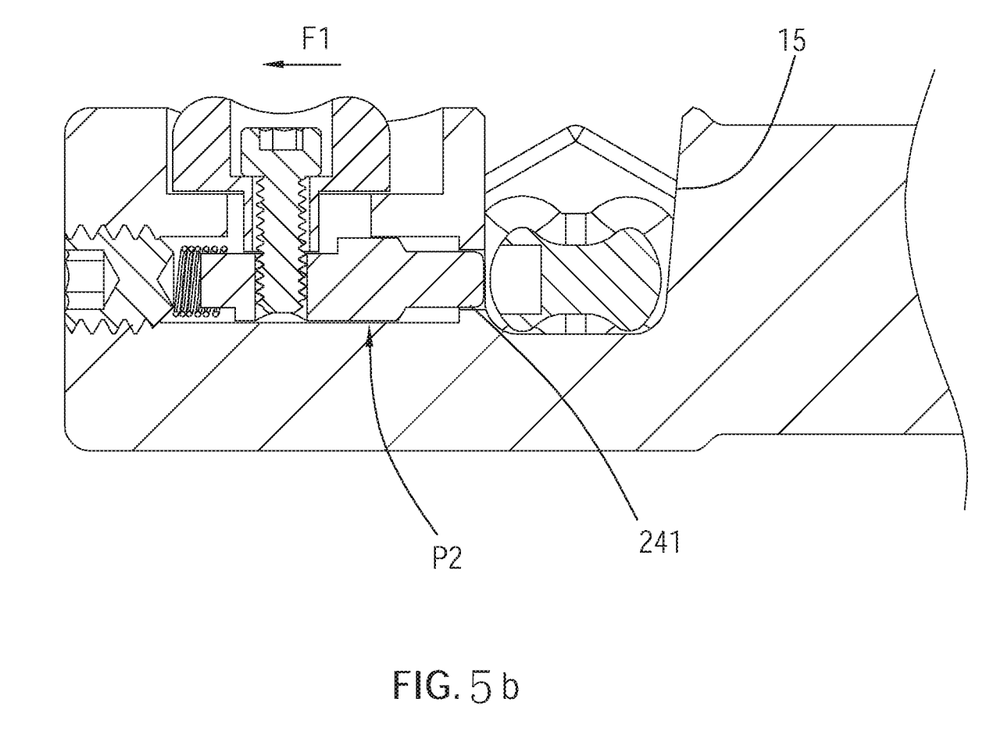
FIG. 5b is similar to FIG. 5a, showing a part of the components of the safety catch connector of the embodiment.

As shown in FIG. 5a and FIG. 5b, the first locking member 20 includes a movable block 22, a latch 24, and a screw 26 for connecting the movable block 22 with the latch 24, wherein the movable block 22 includes an abutting portion 221 and a connecting portion 222. The abutting portion 221 is located in the groove 13, and is operable to move in the groove 13. The connecting portion 222 passes through the passage 14 and is connected to the latch 24. The latch 24 is located in the first containing bore 11, and could be moved between a first position P1 and a second position P2 on the body 10 via the connecting portion 222. One end of the latch 24 includes a locking portion 241, wherein when the latch 24 is at the first position P1, the locking portion 241 enters the recess 15; when the latch 24 is at the second position P2, the locking portion 241 is entirely located in the first containing bore 11.

Both of the first elastic member 40 and the blocking member 30 are disposed in the first containing bore 11, wherein the first elastic member 40 abuts against the latch 24 to push the latch 24 toward the recess 15, until the abutting portion 221 of the movable block 22 abuts against an inner surface of the groove 13 adjacent to the recess 15 or until the connecting portion 222 abuts against an inner surface of the passage 14 adjacent to the recess 15, whereby to keep the latch 24 at the first position P1. The blocking member 30 is adapted to seal the first opening 11a, preventing the first elastic member 40 from being disengaged from the body 10 via the first opening 11a.

Both of the second elastic member 50 and the second locking member 60 are disposed in the second containing bore 12, and the second elastic member 50 abuts against the second locking member 60 to push the second locking member 60 away from the second containing bore 12.

Figure 6:
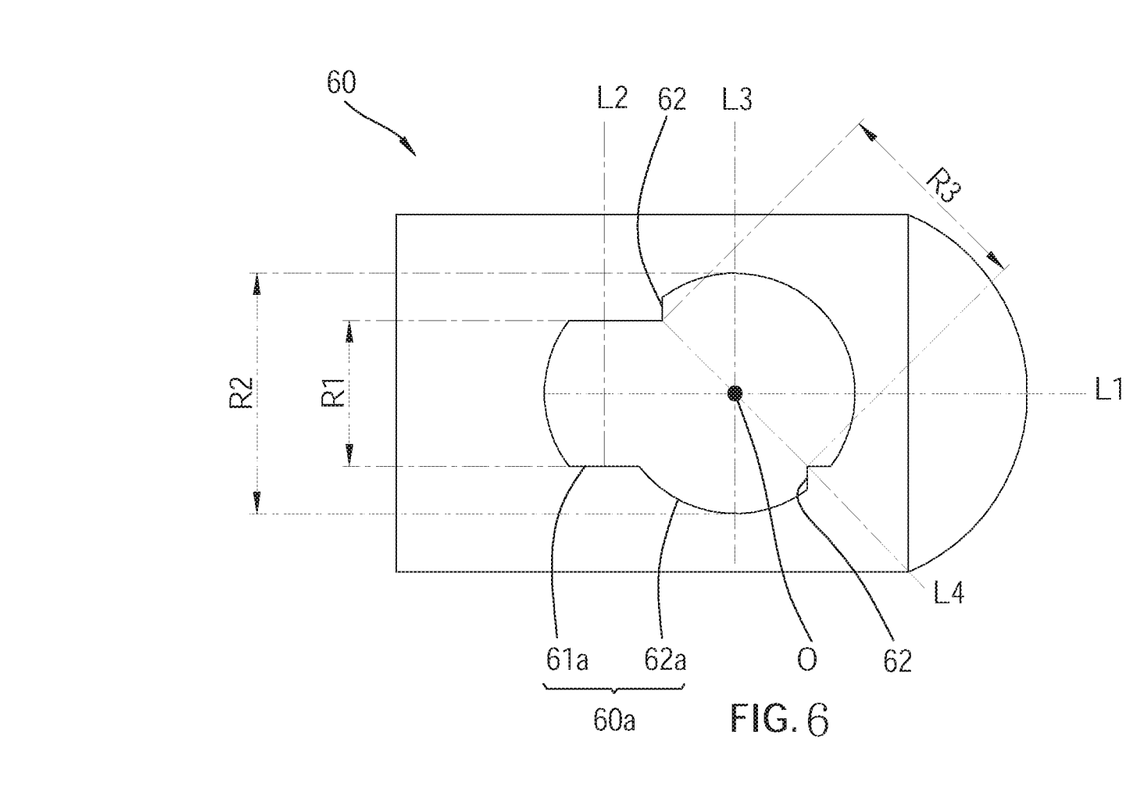
FIG. 6 is a top view, showing a part of the components of the safety catch connector of the embodiment.

The second locking member 60 includes a pivot hole 60a corresponding to the two through holes 16. As shown in FIG. 6, the pivot hole 60a is longitudinally separated into a first portion 61a and a second portion 62a, wherein the first portion 61a has two opposite walls which are parallel to each other and parallel to the axial direction of the body 10. An inner surface of the second portion 62a of the pivot hole 60a is arc-shaped.

There is a first virtual line L1 extending along the axial direction of the body 10, wherein the first virtual line L1 passes through an arc center O of the second portion 62a. There is a second virtual line L2 extending along a direction perpendicular to the first virtual line L1, and the second virtual line L2 passes through the two opposite walls at the first portion 61a. A distance between the opposite walls at the first portion 61a on the second virtual line L2 is defined as a first width R1. There is a third virtual line L3 extending along a direction perpendicular to the first virtual line L1, wherein the third virtual line L3 is parallel to the second virtual line L2, and passes through the arc center O such that a maximum radial distance of the second portion 62a is located on the third virtual line. Along the extending direction of the virtual line L3, the second portion 62a of the pivot hole 60a includes an radial distance which is defined as a second width R2, wherein the second width R2 is greater than the first width R1.

The arc on the outer peripheral surface of the pivot hole 60a includes at least one protrusion 62. In the current embodiment, the at least one protrusion 62 includes two protrusions 62 disposed at two opposite positions of the arc, and a virtual connecting line of the two protrusions passes through the arc center O. There is a fourth virtual line L4 extending passing through the protrusions 62 and the arc center O. A distance between the protrusions 62 on the fourth virtual line L4 is defined as a third width R3, wherein the third width R3 is smaller than the second width R2.

The catch member 70 is substantially U-shaped, and includes a first section 71 and a second section 72 which are respectively disposed at two sides thereof, wherein the first section 71 of the catch member 70 is formed with an annular groove 71a. A lateral of the second section 72 of the catch member 70 includes a positioning hole 72a, and one end of the second section 72 of the catch member 70 includes an abutting block 721, wherein an outer diameter of the abutting block 721 is greater than a width of the recess 15.

Figure 7A:
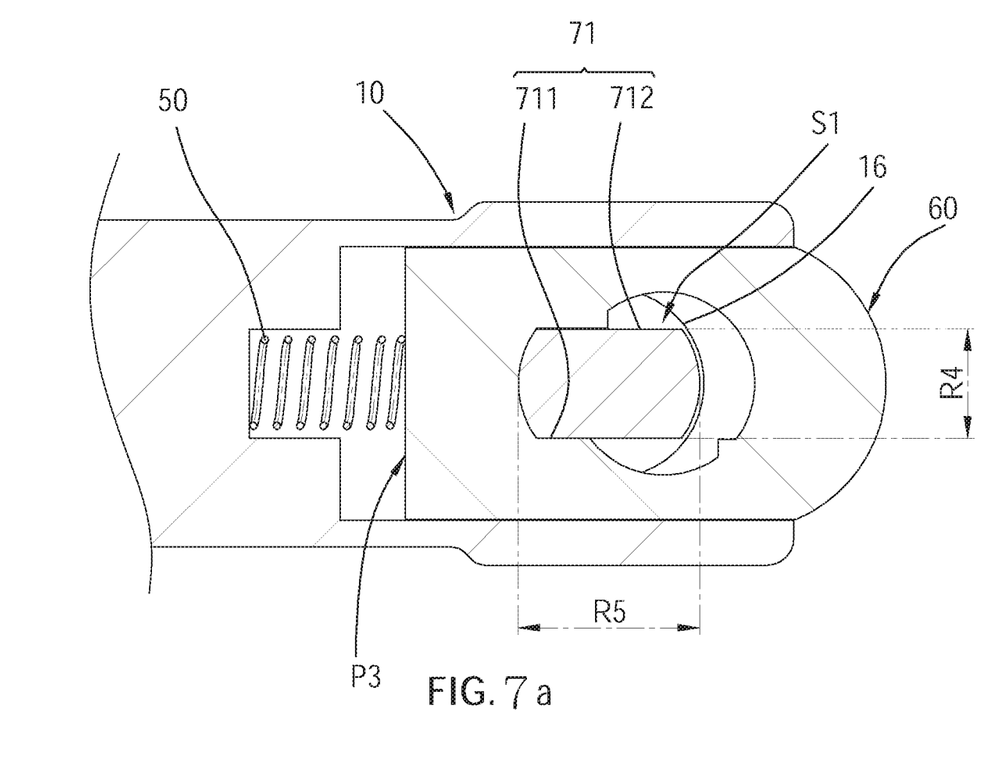
FIG. 7a is a sectional view along the 7a-7a line in FIG. 2.

As shown in FIG. 7a, the first section 71 penetrates the through holes 16 of the body 10 and the pivot hole 60a of the second locking member 60. The first section 71 of the catch member 70 includes a first surface 711 and a second surface 712 opposite to the first surface 711, wherein a distance between the first surface and the second surface is defined as a fourth width R4, and the fourth width R4 is a little smaller than the first width R1. A maximum width of the first section 71 is defined as a fifth width R5, wherein the fifth width R5 is greater than the first width R1 and the third width R3, and is a little smaller than the second width R2.

The catch member 70 is operable to pivot between a locked position S1 and an unlocked position S2. As shown in FIG. 2 and FIG. 7a, when the catch member 70 is at the locked position S1, the second elastic member 50 pushes the second locking member 60 away from the body 10. Until the first portion 61a of the second locking member 60 abutting against the first section 71 of the catch member 70, the second locking member 60 is kept at a third position P3 on the body 10. At the same time, the first surface 711 and the second surface 712 of the catch member 70 respectively abut against the two opposite walls at the first portion 61a, so that the catch member 70 could not pivot relative to the body 10.

As shown in FIG. 5a, when the catch member 70 is at the locked position S1, the second section 72 of the catch member 70 abuts against an inner surface of the recess 15, and the positioning hole 72a of the catch member 70 corresponds to the first containing bore 11. At the same time, the first elastic member 40 pushes the latch 24 to the first position P1, whereby the locking portion 241 is inserted in the positioning hole 72a, so that the catch member 70 could not pivot relative to the body 10.

The blocking ring 80 mounts around the first section 71 of the catch member 70 and abuts against an edge of one of the through holes 16 of the body 10. An inner diameter of the blocking ring 80 fits with the annular groove 71a of the first section 71, and an outer diameter of the blocking ring 80 is greater than an inner diameter of the through holes 16.

In the aforementioned paragraphs, detailed components and the structures of the safety catch connector 100 of the embodiment are explained, while the operation thereof will be described in detail herein. As shown in FIG. 5a and FIG. 4b, an external force F1 is exerted on the movable block 22, so as to move the movable block 22 away from the recess 15 along the inner surface of the groove 13, and the latch 24 is then moved from the first position P1 to the second position P2, whereby to move the locking portion 241 of the latch 24 away from the positioning hole 72a of the catch member 70.

Figure 7B:
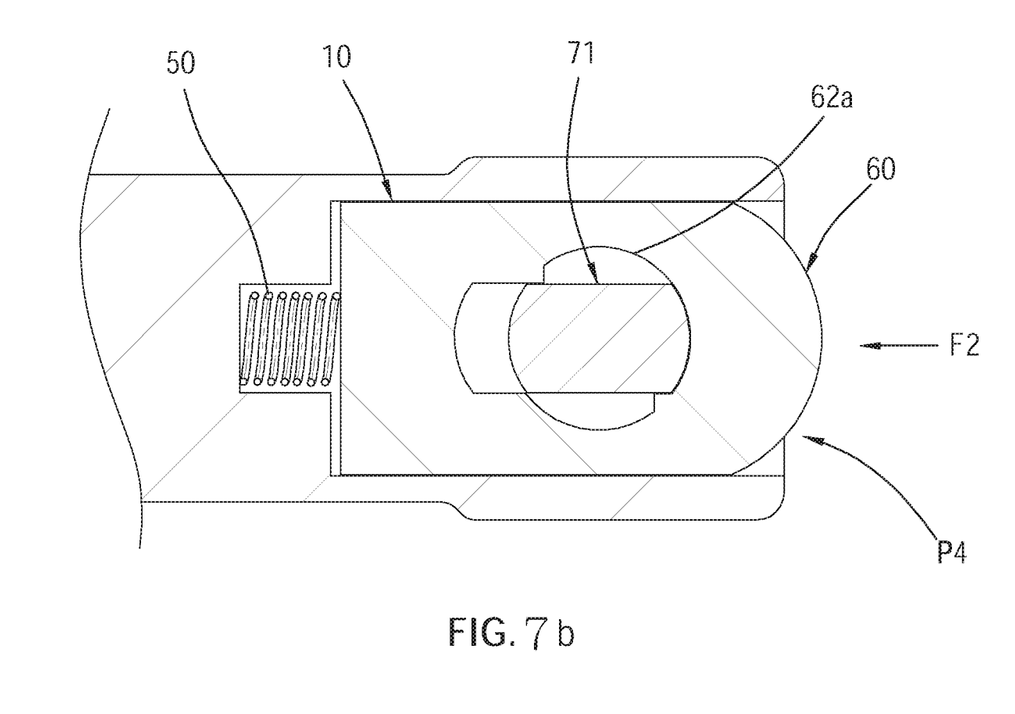

At the same time, as shown in FIG. 7a and FIG. 7b, another external force F2 is exerted on the second locking member 60 to move the second locking member 60 toward an inside of the second containing bore 12, so as to locate the second locking member 60 from the third position P3 to a fourth position P4 on the body 10, so that the first section 71 of the catch member 70 can be located in the second portion 62a of the pivot hole 60a.

Figure 8:
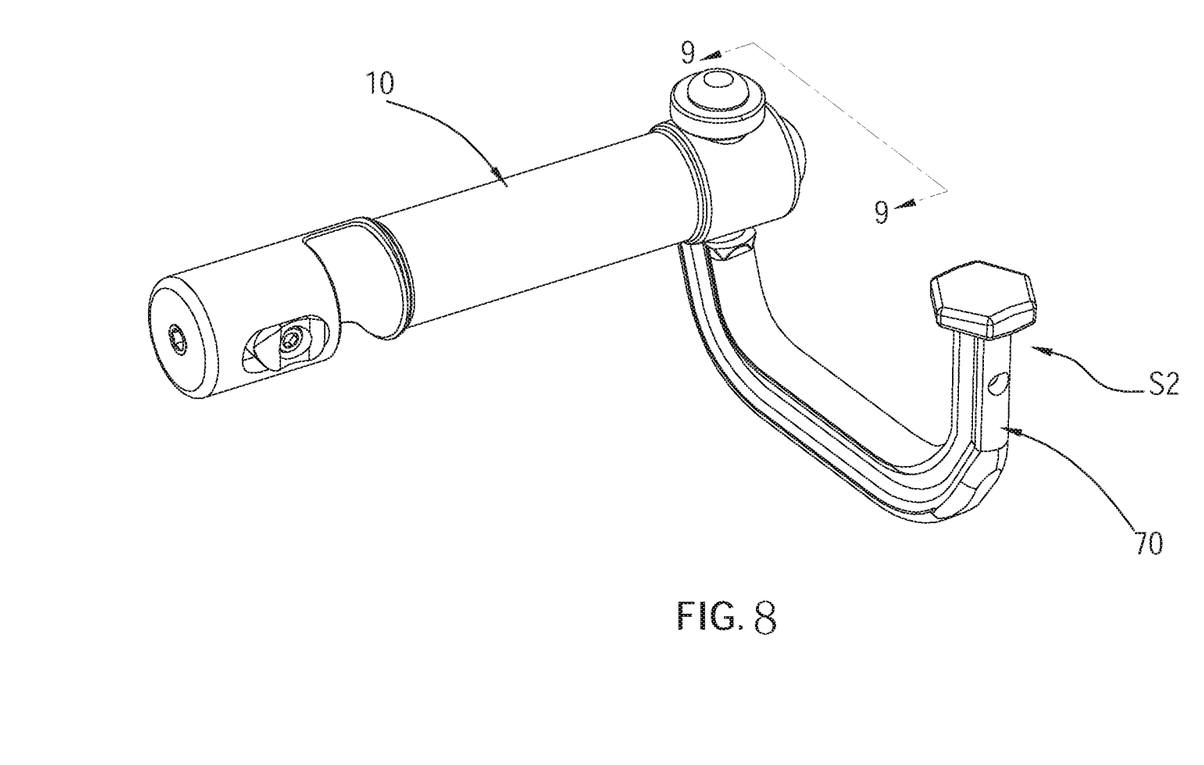
FIG. 8 is a schematic diagram of the safety catch connector of the embodiment.

When the second locking member 60 is at the fourth position P4, the second section 72 of the catch member 70 is not confined in the recess 15 by the locking portion 241. Since the fifth width R5 of the first section 71 of the catch member 70 is smaller than the second width R2, the catch member 70 can be operable to pivot to the unlocked position S2 around the curved inner surface of the second portion 62a of the pivot hole 60a, as shown in FIG. 8.

Figure 9:
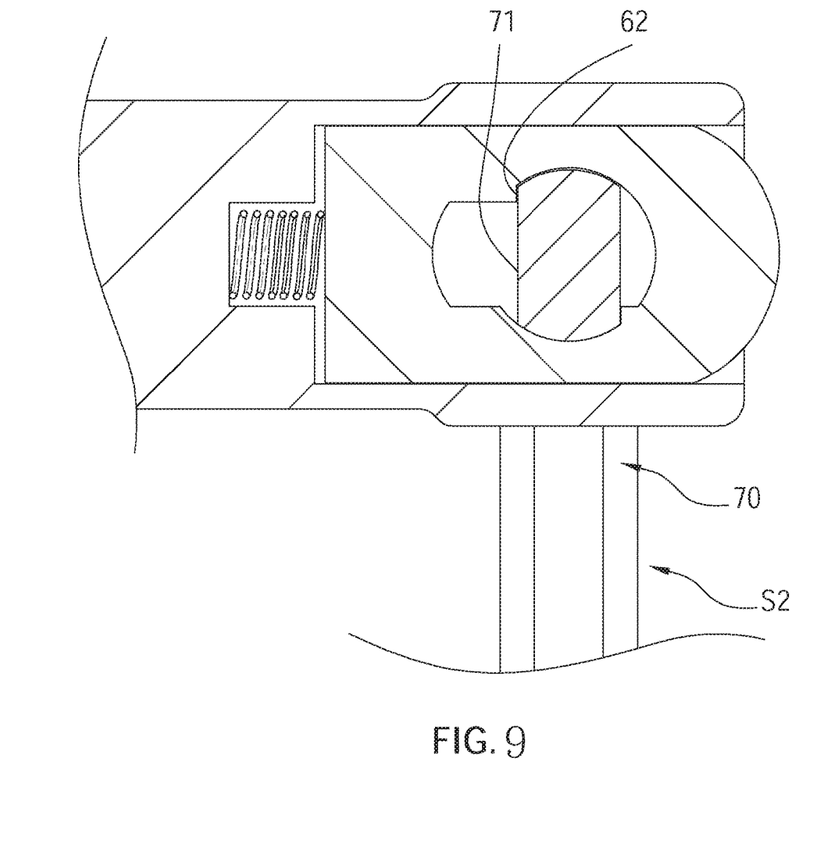
FIG. 9 is a sectional view along the 9-9 line in FIG. 8.

As shown in FIG. 9, since the fifth width R5 is greater than the third width R3, when the catch member 70 is pivoted to a predetermined angle, the first section 71 of the catch member 70 would abut against the protrusions 62, so as to restrict the pivot angle of the catch member 70.

Hence, the body 10 can be engaged with the harness worn by the operator first, and then the lifting lug of the sling can be caught on the catch member 70. Thereafter, the catch member 70 can be pivoted to the locked position S1 again. When the first section 71 of the catch member 70 leaves the inner surface of the second portion 62a of the pivot hole 60a, the compressed second elastic member 50 could be expanded to push the second locking member 60 to the third position P3, so as to lock the first section 71 of the catch member 70. When the external force F1 exerted on the movable block 22 is removed, the compressed first elastic member 40 can be expanded to push the latch 24 to the first position P1, so that the locking portion 241 would be located in the positioning hole 72a of the catch member 70, so as to lock the second section 72 of the catch member 70. In this way, the harness is connected to the sling.

In addition, when the safety catch connector 100 is in use, the blocking ring 80 and the lifting lug are respectively arranged at two sides of the body 10 of the safety catch connector 100, whereby the blocking ring 80 and the abutting block 721 would respectively abut against the edge of one of the two through holes and an edge of the recess 15 when the catch member 70 is pulled, preventing the catch member 70 from being disengaged with the body 10.

Since the catch member 70 could pivot relative to the body 10, the body 10 connected to the harness would not be influenced by the catch member 70 while using the safety catch connector 100, and the catch member 70 would not disengage with the body 10 during the process of locking and unlocking either. In addition, when the catch member 70 is at the locked position S1, the first locking member 20 and the second locking member 60 would lock the catch member 70 automatically, so that the safety catch connector 100 could be easily operated even if the user wears gloves.

It must be pointed out that the embodiments described above are only some preferred embodiments of the present invention. All equivalent structures which employ the concepts disclosed in this specification and the appended claims should fall within the scope of the present invention.

What is claimed is:

1. A safety catch connector, which is adapted to be connected to at least one sling comprising a lifting lug, and a harness worn by a person, comprising:
    a body, which is adapted to be connected to the harness;
    a catch member, which is adapted to be caught by the lifting lug, wherein the catch member comprises a first section and a second section which are respectively disposed at two opposite sides of the catch member; the first section of the catch member is pivotally connected to the body; the catch member is rotatable between an unlocked position and a locked position relative to the body; when the catch member is at the locked position, the second section of the catch member abuts against the body;
    a first locking member, which is disposed on the body and is located adjacent to the second section, wherein the first locking member is operable to move between a first position and a second position on the body; when the first locking member is at the first position, the second section is fixed by the first locking member, and the catch member is locked at the locked position; and
    a second locking member, which is disposed on the body and is located adjacent to the first section, wherein the second locking member is operable to move between a third position and a fourth position on the body; when the second locking member is at the third position, the first section is fixed by the second locking member, and the catch member is locked at the locked position.

2. The safety catch connector of claim 1, wherein the body includes a second containing bore and two through holes communicating with the second containing bore; the second locking member is disposed in the second containing bore, and includes a pivot hole; the pivot hole is longitudinally separated into a first portion and a second portion; the first section of the catch member penetrates through the two through holes and the pivot hole; when the second locking member is at the third position, the first section of the catch member is fitted to the first portion of the pivot hole; when the second locking member is at the fourth position, the first section of the catch member is in the second portion of the pivot hole, and the first section of the catch member is operable to pivot relative to the second locking member.

3. The safety catch connector of claim 2, wherein the first section of the catch member comprises a first surface and a second surface opposite to the first surface; when the second locking member is at the first position, the first surface and the second surface of the first section of the catch member respectively abut against two opposite walls at the first portion of the pivot hole.

4. The safety catch connector of claim 2, further comprising a second elastic member disposed in the second containing bore, wherein the second elastic member is adapted to push the second locking member toward the third position.

5. The safety catch connector of claim 2, wherein an inner surface of the second portion of the pivot hole is an arc surface; the first section of the catch member is operable to pivot around the arc surface.

6. The safety catch connector of claim 5, wherein the arc surface of the second portion of the pivot hole includes at least one protrusion; the at least one protrusion is adapted to be abutted by the first section of the catch member, so as to restrict a pivot angle of the first section of the catch member relative to the body.

7. The safety catch connector of claim 2, further comprising a blocking ring, and the first section of the catch member is formed with an annular groove, wherein an inner diameter of the blocking ring fits with the annular groove, and an outer diameter of the blocking ring is greater than an inner diameter of the through hole; when the safety catch connector is in use, the blocking ring and the lifting lug are respectively arranged at two sides of the body of the safety catch connector.

8. The safety catch connector of claim 1, wherein the second section of the catch member includes a positioning hole; when the first locking member is at the first position, the first locking member is inserted in the positioning hole.

9. The safety catch connector of claim 8, wherein the body further comprises a first containing bore and a first elastic member disposed in the first containing bore, wherein the first elastic member is adapted to push the first locking member toward the first position.

10. The safety catch connector of claim 9, wherein the body comprises a groove communicating with the first containing bore, and the first locking member comprises a latch and a movable block; both of the latch and the first elastic member are located in the first containing bore; when the first locking member is at the first position, the latch is inserted in the positioning hole; the movable block is disposed in the groove and is connected to the latch; the movable block is operable to slide along the groove, so as to push the latch toward the second position.

11. The safety catch connector of claim 1, wherein the body comprises a recess which is conformed to the shape of the second section of the catch member; when the catch member is at the locked position, the second section of the catch member abuts against an inner surface of the recess.

* * * * *